(12) United States Patent
Khripkov (10) Patent No.: US 11,159,659 B2
(45) Date of Patent: Oct. 26, 2021

(54) COMMUNICATION DEVICE HAVING IMPROVED ANTENNA COVERAGE

(71) Applicants: HUAWEI TECHNOLOGIES CO., LTD., Shenzhen (CN); Alexander Khripkov, Helsinki (FI)

(72) Inventor: Alexander Khripkov, Helsinki (FI)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/763,275

(22) PCT Filed: Dec. 20, 2017

(86) PCT No.: PCT/EP2017/083817
§ 371 (c)(1),
(2) Date: May 12, 2020

(87) PCT Pub. No.: WO2019/120515
PCT Pub. Date: Jun. 27, 2019

(65) Prior Publication Data
US 2020/0314223 A1  Oct. 1, 2020

(51) Int. Cl.
*H01Q 1/02* (2006.01)
*H04M 1/02* (2006.01)
*H01Q 1/24* (2006.01)

(52) U.S. Cl.
CPC .......... *H04M 1/0249* (2013.01); *H01Q 1/243* (2013.01)

(58) Field of Classification Search
CPC .... H04M 1/0249; H04M 1/0266; H04M 1/03; H04M 1/6008; H04M 1/72569; H04M 2250/52; H04M 1/026; H04M 1/035; H01Q 1/243; H01Q 13/18; H01Q 1/2266; H04W 88/02
USPC ....................................... 455/575.1
See application file for complete search history.

(56) References Cited

U.S. PATENT DOCUMENTS

| 2002/0101299 | A1  | 8/2002  | Kitamori et al. |
| 2009/0225050 | A1* | 9/2009  | Toyomaki ........... G02F 1/13338 345/173 |
| 2010/0321249 | A1* | 12/2010 | Chiang ................ H01Q 1/2266 343/700 MS |

(Continued)

FOREIGN PATENT DOCUMENTS

| CN | 101667681 A | 3/2010 |
| CN | 102522623 A | 6/2012 |

(Continued)

*Primary Examiner* — Shaima Q Aminzay
(74) *Attorney, Agent, or Firm* — Maier & Maier, PLLC (57) ABSTRACT

A communication device including a housing which includes a front and a surrounding electrically conductive frame, the front including a dielectric cover, where the housing accommodates: a display covered by the cover; an electrically conductive chassis; and at least one substrate including at least one feeding element. Along at least a part of the frame and between the display and the substrate the chassis and the frame are separated from one another by a dielectric-filled intermediate space. Along the part of the frame and between the cover and the dielectric-filled intermediate space the display is separated from the frame by a gap. The dielectric-filled intermediate space together with the frame and the chassis form at least one waveguide structure extending between the substrate and the gap.

15 Claims, 13 Drawing Sheets

(56) References Cited

U.S. PATENT DOCUMENTS

| | | | |
|---|---|---|---|
| 2014/0240186 A1 | 8/2014 | Zhou et al. | |
| 2016/0118713 A1 | 4/2016 | Hong et al. | |
| 2016/0226131 A1 | 8/2016 | McMilin et al. | |
| 2016/0351996 A1* | 12/2016 | Ou | H01Q 21/065 |
| 2017/0069958 A1 | 3/2017 | Ko et al. | |
| 2017/0201011 A1 | 7/2017 | Khripkov et al. | |

FOREIGN PATENT DOCUMENTS

| | | |
|---|---|---|
| CN | 103384026 A | 11/2013 |
| CN | 105789830 A | 7/2016 |
| CN | 207459171 U | 6/2018 |
| JP | 2012175624 A | 9/2012 |
| JP | 3204894 U | 6/2016 |
| JP | 3210429 U | 5/2017 |
| WO | 2017114063 A1 | 7/2017 |

* cited by examiner

COMMUNICATION DEVICE HAVING IMPROVED ANTENNA COVERAGE

CROSS-REFERENCE TO RELATED APPLICATIONS

This application is a national stage of International Application No. PCT/EP2017/083817, filed on Dec. 20, 2017, which is hereby incorporated by reference in its entirety.

TECHNICAL FIELD

Aspects of the embodiments relate to a communication device including a housing, the housing including a front and a surrounding electrically conductive frame.

BACKGROUND

In the fifth generation (5G) millimetre wave mobile communication, the radio application requires the use of antenna arrays with multiple radiating elements to meet the requirements of high gain and beam forming. According to the 3GPP definition of performance parameters for the fifth generation (5G) new radio (NR) user equipment (UE) beamforming, the 5G UE shall use omni-coverage millimetre wave antennas with generally constant equivalent isotropically radiated power (EIRP)/effective isotropic sensitivity (EIS) and diversity/multiple input multiple output (MIMO) performance, in order to achieve stable communication in all directions and orientations. By "omni-coverage" is meant that an antenna radiates equally well in all directions. It is difficult to provide omni-coverage for 5G UE due to the limited space in the UE.

SUMMARY

The mobile communication industry is working towards maximizing the display/screen dimensions relatively to the outline dimensions of the UE body. Consequently, the display will almost cover the entire front of the UE. Increasing the display area imposes technical challenges for all mobile antennas. For instance, the display has a significant impact on spherical beamforming coverage. Conductive structures of the display act as a blocker which leads to beam distortion and approximately 10 dB loss in the display directions. The metal frame of the housing of the UE, along with the metal chassis accommodated by the housing, cause additional challenges for the beamforming spherical coverage.

An object of embodiments is thus to provide an improved antenna arrangement for a UE (or communication device).

According to a first aspect, the above-mentioned object is attained by providing a communication device including a housing which includes a front and a surrounding electrically conductive frame, the front including a dielectric cover, where the housing accommodates:
  a display, or screen, covered by the cover;
  an electrically conductive chassis; and
  at least one substrate including at least one feeding element;
  along at least a part of the frame and between the display and the substrate the chassis and the frame are separated from one another by a dielectric-filled intermediate space;
  along the part of the frame and between the cover and the dielectric-filled intermediate space the display is separated from the frame by a gap;
  whereby the dielectric-filled intermediate space together with the frame and the chassis form at least one waveguide structure extending between the substrate and the gap.

With such a communication device, the antenna coverage performance of an antenna arrangement, including the feeding element and the waveguide, is improved, and the influence of the human body effect can be counteracted. In other words, the radiation coverage is expanded, and the human body effect is reduced. The communication device is especially useful for so-called millimetre wave communication, e.g. within a frequency range of 15-100 GHz. A communication device configured for millimetre wave communication should include a millimetre wave antenna arrangement configured for millimetre wave communication, e.g. within the frequency range of 15-100 GHz. Since the at least one waveguide structure in general radiates towards the display/screen side of the communication device, the human body effect is reduced since the user of the large-screen UE essentially does not cover the display/screen side by a hand when using the UE. Thus, an uncompromised handheld UE design with a large screen and metal frame with a minimum number of cuts is provided. By the embodiments, no slots in the frame for radiation are thus needed. Further, by the embodiments, an improved millimetre wave antenna arrangement with improved omni-coverage is provided. The feeding element may also be called antenna feeding element or antenna radiating element.

In a possible implementation form of a communication device according to the first aspect, the feeding element is connected to a radio frequency integrated circuit via a feedline. An advantage with this implementation form is that the high production yield is assured by manufacturing antenna feeding elements and feedlines within the substrate.

In a further possible implementation form of a communication device according to the first aspect, the substrate is adjacent to one side of the frame. An advantage with this implementation form is that the electromagnetic radiation of each antenna feeding element to free space is equally efficient, and thus the antenna coverage performance of the antenna arrangement is further improved.

In another possible implementation form of a communication device according to the first aspect, the housing accommodates a main printed circuit board, where part of the chassis is located between the display and the main printed circuit board. An advantage with this implementation form is that a cost-effective UE integration is achievable by utilizing the main printed circuit board as a carrier for the UE components. In addition, improved manufacturing procedures and cost efficiency are provided.

In yet another possible implementation form of a communication device according to the first aspect, the substrate is part of the main printed circuit board. An advantage with this implementation form is that a compact structure is provided, thus providing a further improved antenna arrangement.

In still another possible implementation form of a communication device according to the first aspect, the substrate is a second printed circuit board electrically connected to the main printed circuit board. An advantage with this implementation form is that the flexibility in arranging the antenna elements is improved, and thus the antenna coverage performance of the antenna arrangement is yet further improved.

In a possible implementation form of a communication device according to the first aspect, the chassis is coupled to the substrate via the main printed circuit board. An advantage with this implementation form is that a compact structure is provided, thus providing a further improved antenna arrangement with improved omni-coverage.

In a further possible implementation form of a communication device according to the first aspect, the gap is filled with a dielectric material. An advantage with this implementation form is that a stability in the structure is provided, dimensions of the gap are effectively reduced, and a further improved antenna arrangement with improved omni-coverage is provided.

In another possible implementation form of a communication device according to the first aspect, the at least one substrate defines at least one dielectric-filled cavity with at least partially electrically conductive sides, where the feeding element is located in the cavity or adjacent thereto. An advantage with this implementation form is that a stable impedance matching for antenna feeding elements is assured with high production yield, and thus the antenna arrangement is further improved with improved omni-coverage performance.

In yet another possible implementation form of a communication device according to the first aspect, the at least partially electrically conductive sides of the dielectric-filled cavity include a plurality of electrically conductive vias. An advantage with this implementation form is that improved manufacturing procedures and cost-efficiency is provided for the antenna arrangement.

In still another possible implementation form of a communication device according to the first aspect, the substrates or substrate define(s) a plurality of dielectric-filled cavities with at least partially electrically conductive sides, where in each cavity or adjacent thereto a feeding element is located, and where each feeding element is connected to the radio frequency integrated circuit via its own feedline. By this implementation, an array of antennas with beamforming and beam-steering features is provided. An advantage with this implementation form is that a further improved antenna arrangement with improved omni-coverage is provided.

In a possible implementation form of a communication device according to the first aspect, the housing accommodates at least one electrically conductive wall, where two adjacent cavities are separated from one another by the wall, where the wall is connected to the frame and to the chassis, whereby the dielectric-filled intermediate space is separated into a plurality of dielectric-filled compartments, each compartment defining a waveguide. An advantage with this implementation form is that the coupling between the adjacent cavities/corresponding feeding elements is prevented, and an improved millimetre wave antenna arrangement with improved efficiency and beamforming omni-coverage is provided. A further advantage with this implementation form is that the mechanical strength of the UE is improved by said conductive walls connected to the frame and to the chassis.

In a further possible implementation form of a communication device according to the first aspect, the housing accommodates at least one electrically conductive wall, where two adjacent cavities are separated from one another by the wall, where the wall is connected to the frame and separated from the chassis, or the wall is connected to the chassis and separated from the frame. An advantage with this implementation form is that an improved millimetre wave antenna arrangement with improved omni-coverage is provided. A further advantage with this implementation form is that spacing between the frame and the chassis is effectively utilized, as yet an additional antenna of the UE is configured in yet another frequency band, for example configured to operate at sub 6 GHz frequency bands.

In another possible implementation form of a communication device according to the first aspect, the communication device includes a plurality of modules, each module including:
- the at least one substrate defining the plurality of dielectric-filled cavities;
- where in each cavity or adjacent thereto a feeding element and a feedline are located;
- a radio frequency integrated circuit, which is connected to the feeding elements via the feedlines;
- at each module along at least a part of one side of the frame and between the display and the substrate the chassis and the frame are separated from one another by a dielectric-filled intermediate space;
- at each module along the part of one side of the frame and between the cover and the dielectric-filled intermediate space the display is separated from the frame by a gap; and a plurality of waveguide structures, each waveguide structure being formed at least by the dielectric-filled intermediate space, the frame, the chassis and the wall(s). An advantage with this implementation form is that the radiation coverage is further expanded and the human body effect is even more reduced.

In yet another possible implementation form of a communication device according to the first aspect, the modules in relation to one another are placed on generally opposite sides of the communication device. An advantage with this implementation form is that an improved omni-coverage is provided.

The above-mentioned features and implementations may be combined in various possible ways providing further advantageous implementations. Further applications and advantages will be apparent from the following detailed description.

BRIEF DESCRIPTION OF THE DRAWINGS

The appended drawings are intended to clarify and explain different embodiments, in which:

FIG. 3b is a top view of two of the feeding elements and surrounding sides of FIG. 6a;

DETAILED DESCRIPTION

The communication device 102, 802 herein disclosed may be denoted as a user device, a user equipment (UE), a mobile station, an internet of things (IoT) device, a sensor device, a wireless terminal and/or a mobile terminal, enabled to communicate wirelessly in a wireless communication system, sometimes also referred to as a cellular radio system, for example an LTE or new radio (NR/5G) communication system. The UEs may further be referred to as mobile telephones or cellular telephones with wireless capability. The UEs in the present context may be pocket-storable and is portable, hand-held, computer-comprised, or vehicle-mounted mobile devices, enabled to communicate voice and/or data, via the radio access network, with another entity, such as another receiver or a server.

The embodiments are suitable for so-called millimetre wave mobile communication. For example, the disclosed embodiments are suitable within a range of 15-100 GHz, e.g. an operating frequency band of 24.25-29.5 GHz, 31.8-33.4 GHz, 37-43.5 GHz, 45.5-52.6 GHz, 66-76 GHz or 81-86 GHz, which are allocated for mobile service and 5G deployments. Another example of an operating frequency band is 57-66 GHz, which is allocated for unlicensed operations and/or wireless local area network communication.

Figure 1:
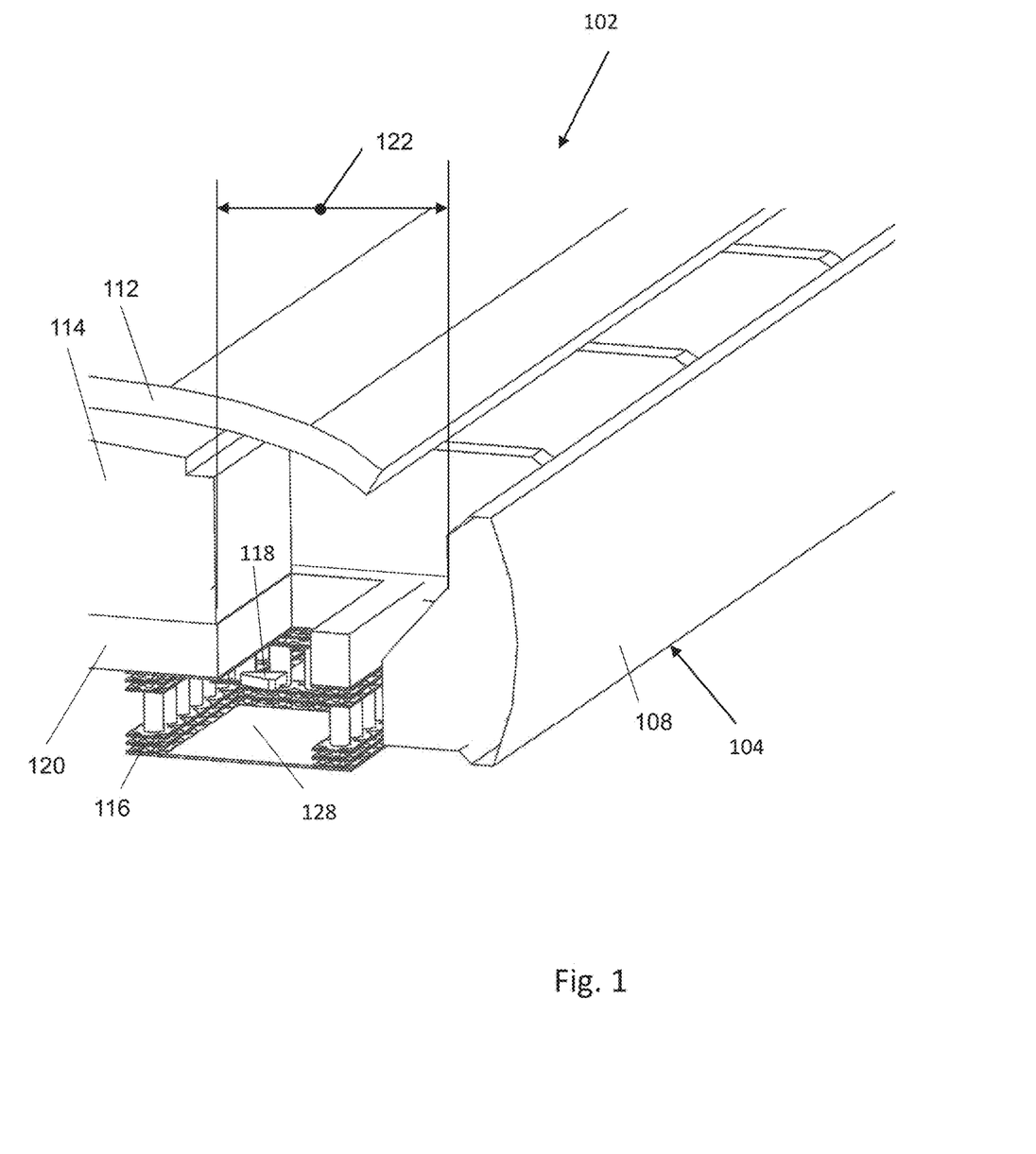
FIG. 1 is a schematic perspective view illustrating a part of an embodiment of the communication device.
Figure 2:
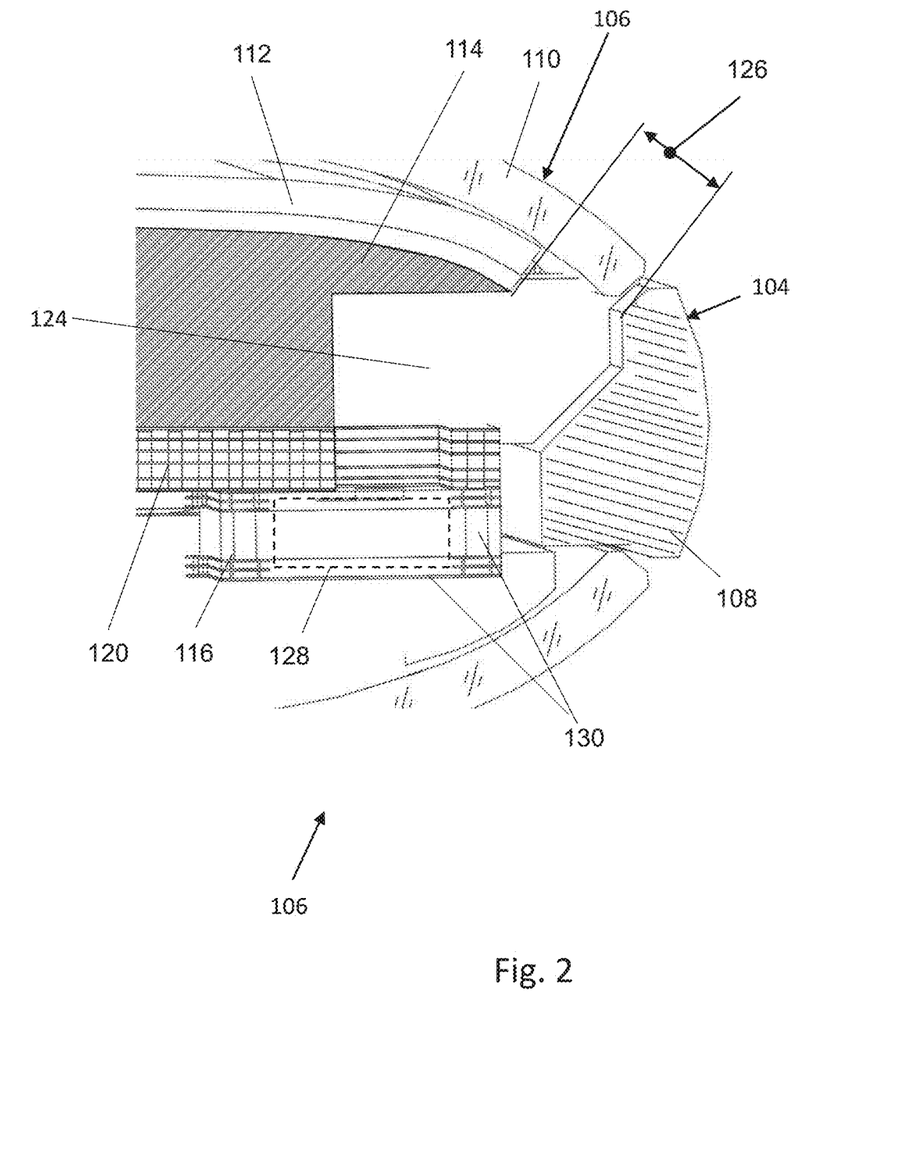
FIG. 2 is a schematic perspective view illustrating a part of the embodiment of FIG. 1.

With reference to FIGS. 1 and 2, a part of an embodiment of the communication device 102 is disclosed. The communication device 102 includes a housing 104, which includes a front 106 (see FIG. 2) and a surrounding electrically conductive frame 108, e.g. made of metal. However, other materials are possible, as desired. The front 106 includes a dielectric cover 110. The housing 104 accommodates a display 112 (or screen) covered by the dielectric cover 110. The housing 104 also accommodates an electrically conductive chassis 114 and at least one substrate 116 provided with at least one feeding element 118. Alternatively, the feeding element 118 may be called antenna feeding element, antenna element or radiating element. Further, the housing 104 accommodates a main printed circuit board (PCB) 120. Part of the chassis 114 is located between the display 112 and the main PCB 120. The substrate 116 is a second PCB electrically connected to the main PCB 120. The electrically conductive chassis 114 is coupled to the substrate 116 via the main PCB 120. Alternatively, the substrate 116 may be part of the main PCB 120. As seen in FIGS. 1 and 2, the substrate 116 is adjacent to one side of the frame 108.

With reference to FIG. 1, along at least a part of the frame 108 and between the display 112 and the substrate 116, the chassis 114 and the frame 108 are separated from one another by a dielectric-filled intermediate space 124 (see FIG. 2) illustrated by the distance 122, With reference to FIG. 2, along the part of the frame 108 and between the cover 106 and the dielectric-filled intermediate space 124, the display 112 is separated from the frame 108 by a gap 126. The dielectric-filled intermediate space 124, together with the frame 108 and the chassis 114, form at least one waveguide structure which extends between the substrate 116 and the gap 126. The electromagnetic energy from the feeding element 118 is coupled to the waveguide structure and directed towards the front dielectric cover 106 and radiated to the free-space via the gap 126. The width of the gap 126 may be 0.15 of the wavelength ($\lambda_0$) at the lowest frequency of the operating band in the respective dielectric filling of the respective volume, e.g. 1 mm for 24.25-29.5 GHz feeding elements 118. The distance 122 (see FIG. 1) between the chassis 114 and the frame 108 may be 0.5 of the wavelength ($\lambda_0$) at the lowest frequency of the operating band in the respective dielectric filling of the respective volume, or less, e.g. 2.5 mm for 24.25-29.5 GHz feeding elements 118. With reference to FIG. 1, the main PCB 120 may be provided with an opening above the feeding element 118. Alternatively, the main PCB 120 may be continuous above the feeding element 118 but just free of a metal in the area above the feeding element 118. The term millimetre wave antenna arrangement may be introduced, which includes the feeding elements 118 and the waveguide structures.

The housing 104 of the communication device 102 may have a back cover. The substrate 116 may be located between the back cover and the chassis 114. The substrate 116 may be located between the back cover and the main PCB 120. In general, the display 112 is located between the cover 106 and the chassis 114. The substrate 116 includes at least one dielectric layer. The gap 126 can be filled with a dielectric material to provide further advantages.

With reference to FIGS. 1, 2 and 3, the substrate 116 defines at least one dielectric-filled cavity 128 with at least partially electrically conductive sides 130, e.g. in the form of conductive vias 304. The feeding element 118 is located in the cavity 128 or adjacent thereto.

Figure 3A:
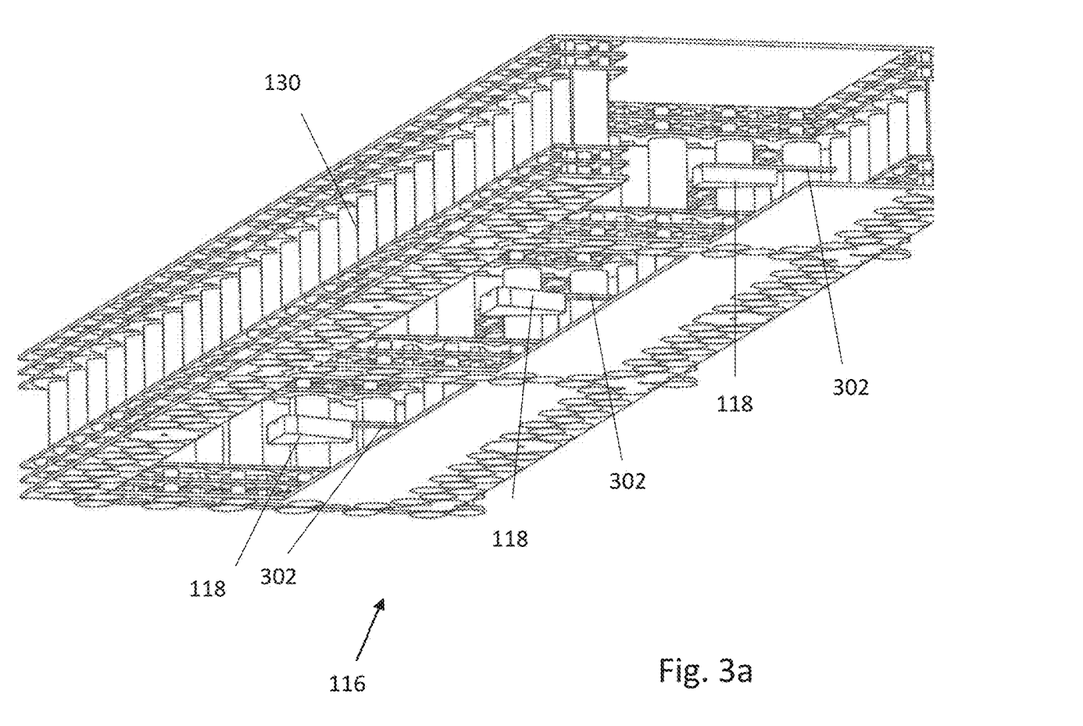
FIG. 3a a schematic perspective view of three of the feeding elements and surrounding sides of the substrate of the embodiment of FIG. 1.
Figure 3B:
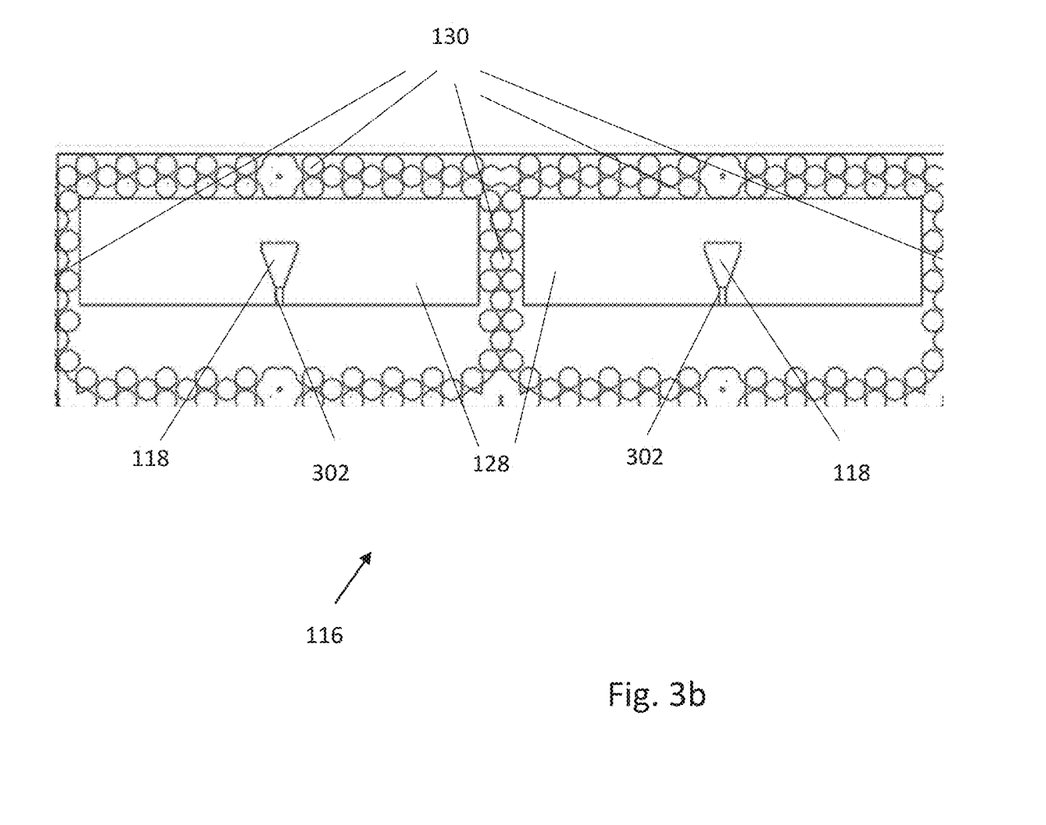
Figure 3C:
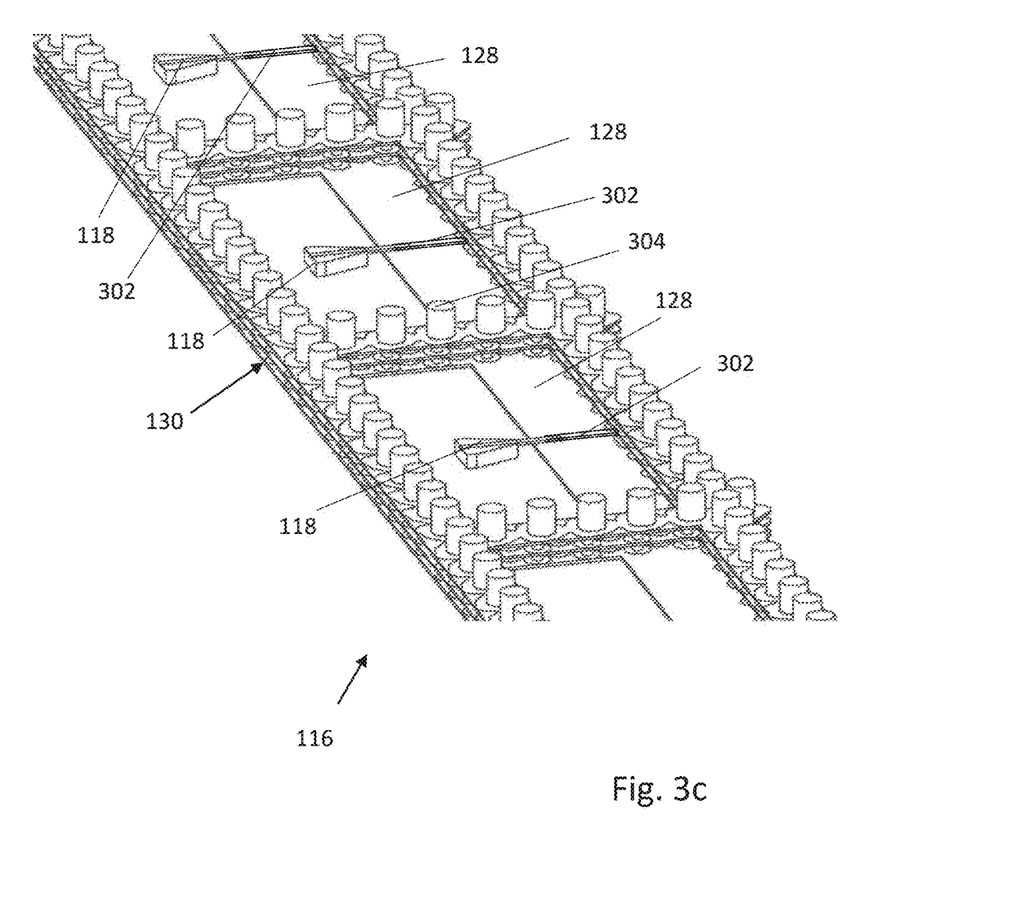
FIG. 3c is another perspective view of the three feeding elements and surrounding sides of the embodiment of FIG. 1.

With reference to FIGS. 3a-c, the feeding element 118 and the associated dielectric-filled cavity 128 are described in further detail. FIG. 3a shows three feeding elements 118 each connected to a radio frequency integrated circuit (RFIC). The RFIC may be arranged on the main PBC or on the substrate 116. Each cavity 128 and feeding element 118 is surrounded by at least partially electrically conductive sides 130. The at least partially electrically conductive sides 130 of the dielectric-filled cavity include a plurality of electrically conductive vias 304. The substrate 116 defines a plurality of dielectric-filled cavities 128 with the at least partially electrically conductive sides 130. Each feeding element 118 is located in a respective cavity 128 or adjacent thereto. Each feeding element 118 is connected to the RFIC via its own feedline 302, e.g. a planar feedline, such as a strip-line, microstrip, or a grounded coplanar waveguide line. The feedline 302 connects the feeding elements 118 with the signal ports of the RFIC. Each feeding element 118 may have a wedge shape, which gradually increases in width from the feedline 302 towards the edge of the substrate 116. The feeding elements 118 may include open-ended stubs as illustrated in FIGS. 3a-3c. The shape of the open-ended stub is configured for impedance matching within the operating frequency bands.

The feeding element 118 and the feedline 302 may be formed on the substrate 116 e.g. by being printed to the substrate 116. The substrate 116 may e.g. be configured as a monolithic multilayer structure, e.g. a PCB, flip chip packaging, or a low temperature co-fired ceramic (LTCC).

Figure 3D:
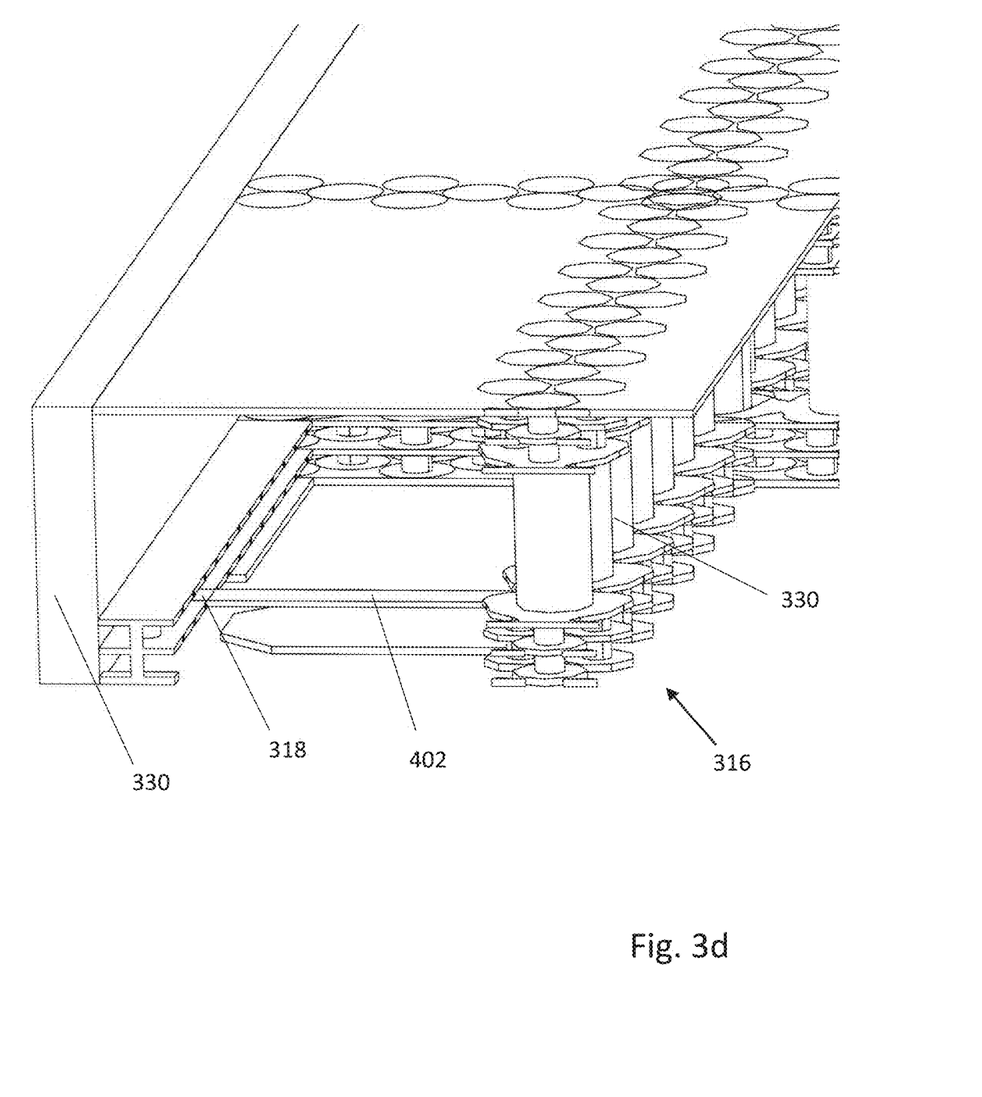
FIG. 3d is a sectional perspective view of an alternative arrangement of the feeding elements and feedlines on the substrate.
Figure 3E:
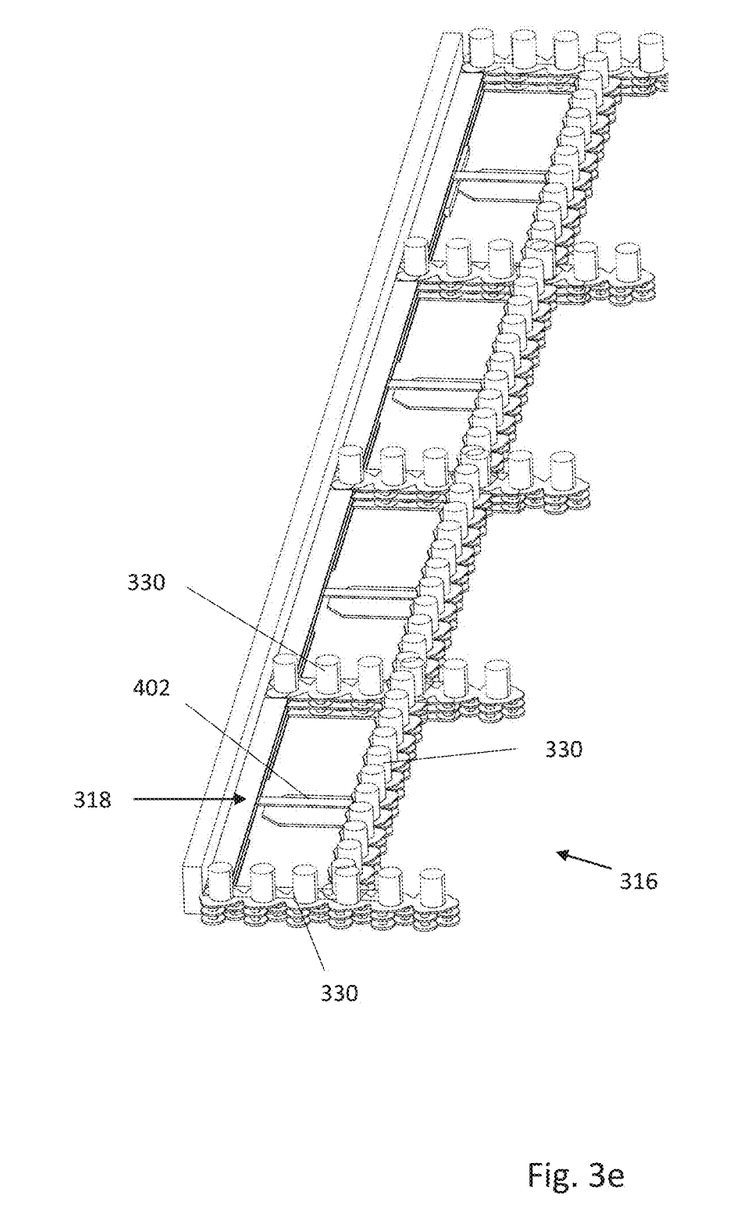
FIG. 3e is a sectional perspective view of the arrangement of FIG. 3d.
Figure 3F:
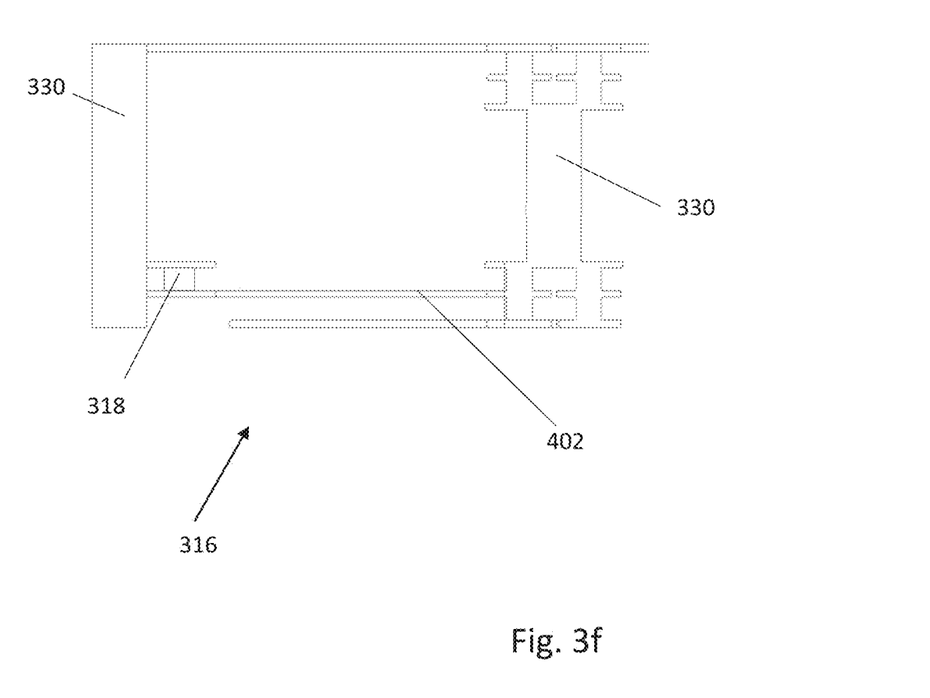
FIG. 3f is a cross-section view of the arrangement of FIG. 3d.

With reference to FIGS. 3d-f, an alternative arrangement of the feeding element 318, the associated feedlines 402 and the partially electrically conductive sides 330 is disclosed. The feeding element 318 includes a short-circuited stub. The short-circuited stub of the feeding element 318 connects the feedline 402 with the electrically conductive side 330 at the outer edge of the substrate 316.

In both alternatives shown in FIGS. 3a-f, the feeding elements 118, 318 are configured to transform TEM mode of the feedline 302, 402 into TE1x mode or quazi-TEM mode of the dielectric-filled cavity 128. The dielectric-filled cavity 128 is coupled with the corresponding waveguide structure 502 (see inter alia FIG. 5), which supports the same mode as the dielectric-filled cavity 128. The wave guide structure 502 is exciting surface currents on the outer surface of the frame 108 and the outer surface of the display 112. Thus, electromagnetic radiation towards the display 112 is performed.

For example, impedance matching is defined by the substrate's 116, 316 topology. Other conductive structures and dielectric structures of the communication device 102 have in general little or no impact on impedance matching and, therefore, no impact on the instability of the assembly process.

Figure 4:
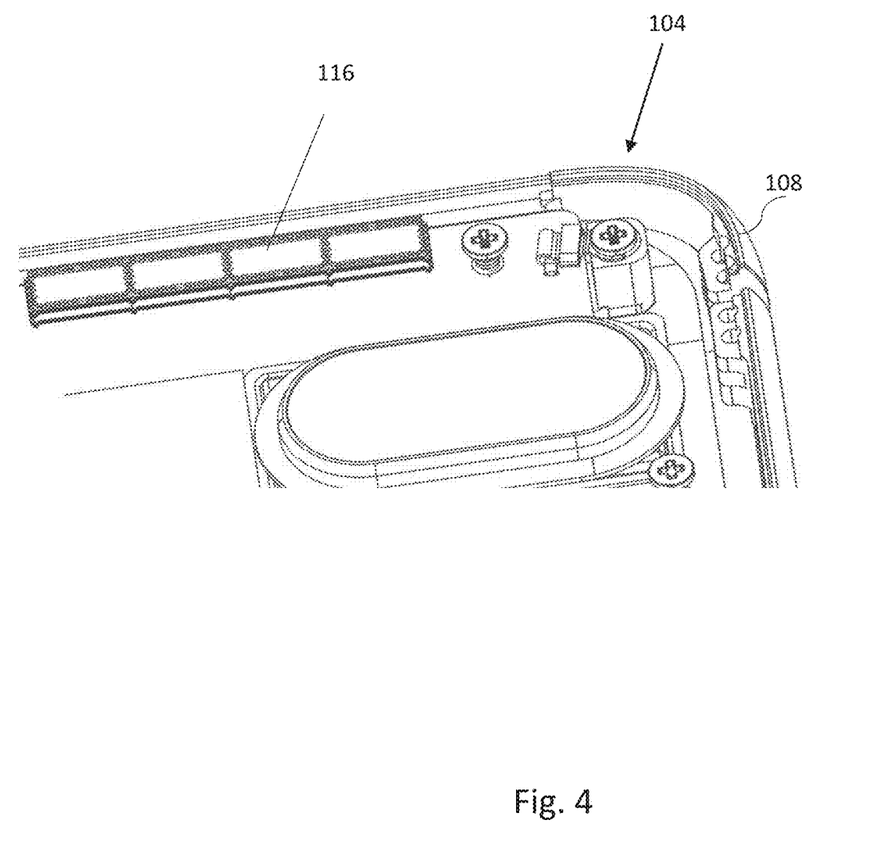
FIG. 4 is a schematic perspective view illustrating the substrate.

In FIG. 4, the arrangement of the substrate 116 in the housing 104 is illustrated as viewed from the back of the communication device with the back cover left out. As seen in FIG. 4, the substrate 116 is mounted close to the side of the frame 108.

Figure 5:
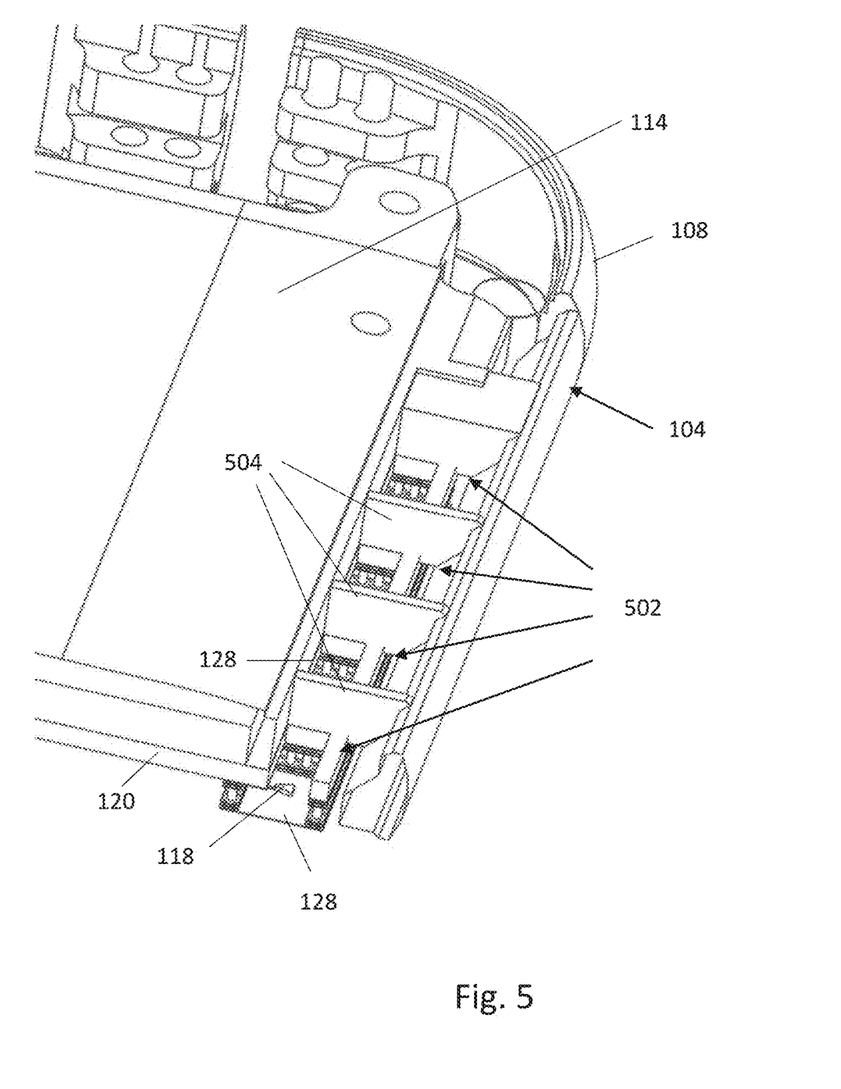
FIG. 5 is a schematic perspective view illustrating a part of the embodiment of FIG. 1 with elements left out for illustrative purposes.

With reference to FIG. 5, four cavities 128 and four feeding elements 118 are present, and, consequently, four waveguide structures 502. The housing 104 accommodates at least one electrically conductive wall 504. In the present example, three walls 504 are provided. Two adjacent cavities 128 are separated from one another by a wall 504. The walls 504 are connected to the frame 108 and to the chassis 114, whereby the dielectric-filled intermediate space 124 is separated into a plurality of dielectric-filled compartments 502. Each compartment 502 defines a waveguide 502. In the present example of FIG. 5, four waveguides 502 are present. The three walls 504 extend substantially perpendicular from the frame 108. In FIG. 5, it is also illustrated that the frame 108 towards to the chassis 114 has a tapered shape, and thus also the waveguide structure 502 having tapered shapes. The tapered shape is narrower closer to the feeding element 118. By means of the walls 504, coupling between two cavities/feeding elements 128/118 is avoided.

Figure 6:
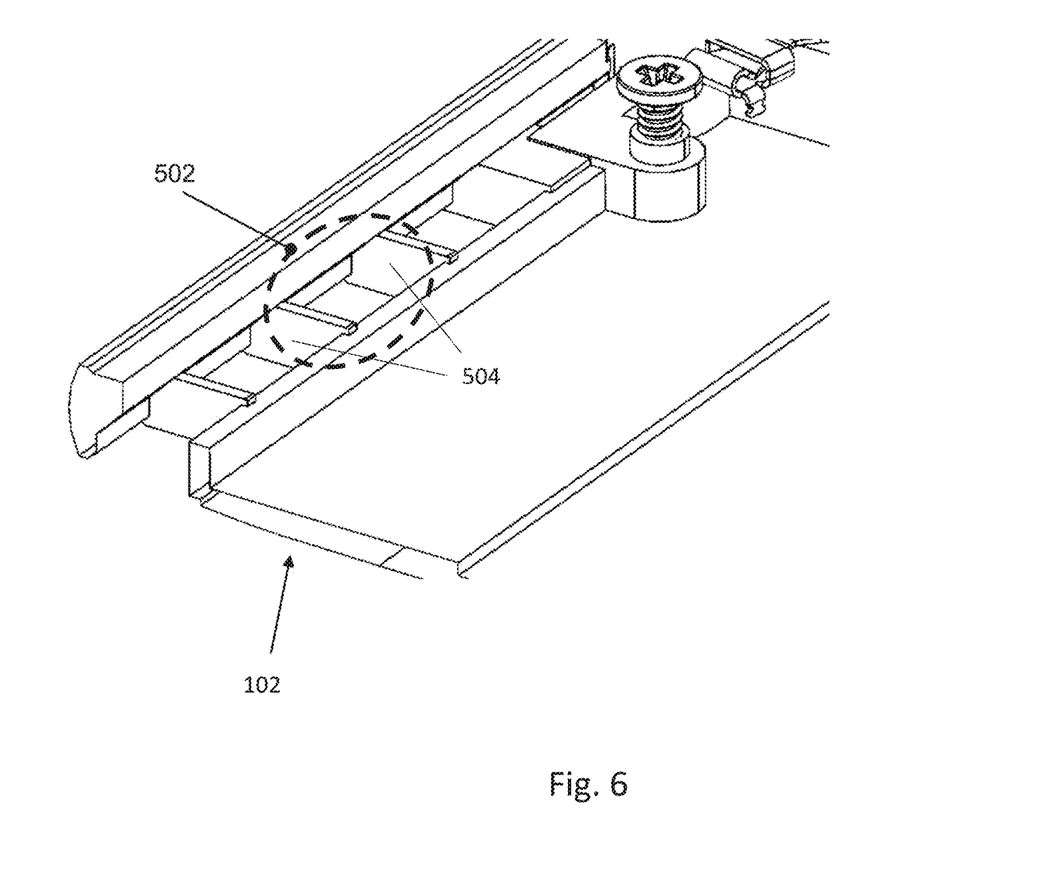
FIG. 6 is a schematic perspective view of a part of the backside of the embodiment of FIG. 1 with elements left out for illustrative purposes.

With reference to FIG. 6, the compartments/waveguides 502 and associated walls 504 are illustrated as seen from the backside of the communication device 102.

Figure 7:
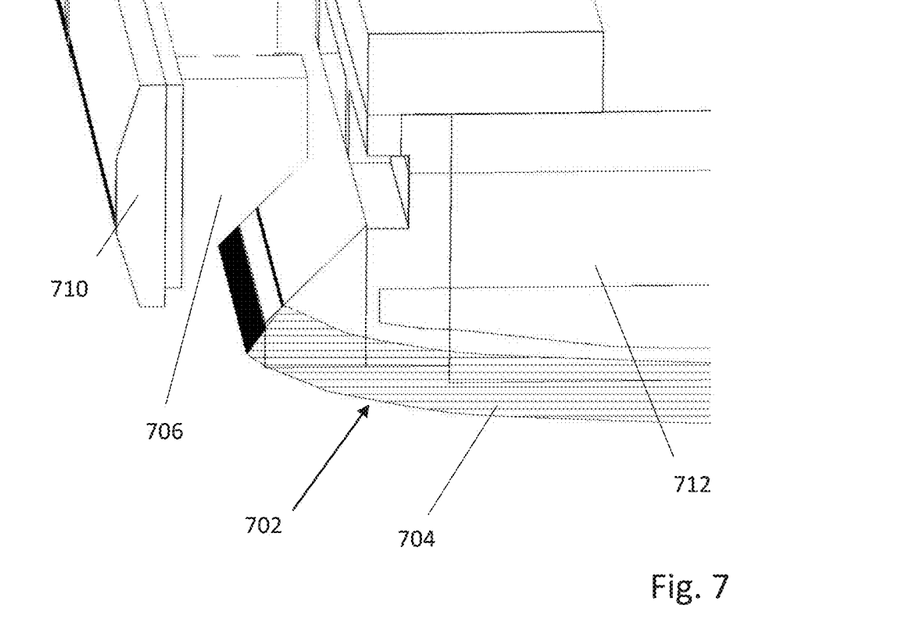
FIG. 7 is a schematic perspective view illustrating a part of a second embodiment of the communication device.

With reference to FIG. 7, a communication device 702 according to a further embodiment is provided. The housing 704 accommodates at least one electrically conductive ridge 706, where two adjacent cavities 708 (see FIG. 8) are separated from one another by at least one ridge 706. The electrically conductive ridges 706 are configured as isolation ridges configured to suppress parasitic surface wave propagation within the inner volume (or the dielectric-filled intermediate space) between the electrically conductive frame 710 and the chassis 712. Thus, parasitic mutual coupling between adjacent feedlines on the substrate is assured within the operation bandwidth.

In some embodiments, the ridge 706 is connected to the surrounding electrically conductive frame 710, but separated from the electrically conductive chassis 712. In another embodiment, the ridge 706 is connected to the electrically conductive chassis 712, but separated from the surrounding electrically conductive frame 710. In both cases, the frame 710 may be galvanically isolated from the chassis 712.

Figure 8:
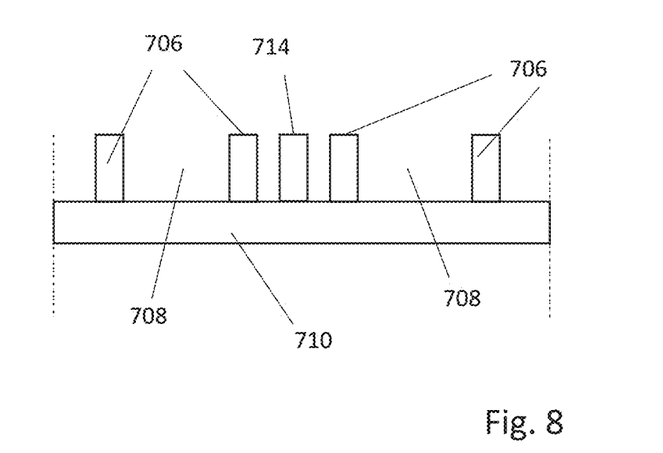
FIG. 8 is a schematic view of some walls of the embodiment of FIG. 7.

With reference to FIG. 8, some ridges 706 of the embodiment of FIG. 7 are illustrated. It is shown that a waveguide ridge 714 is provided between two electrically conductive ridges 706. The waveguide ridge 714 is configured to electromagnetically couple the dielectric-filled cavities 128 with corresponding waveguide structures 502 of the cavities 708. The waveguide ridge 714 is configured to guide electromagnetic waves in the display direction and further electromagnetic radiation from the gap 126. The ridges 706, 714 extend substantially perpendicular from the frame 710. The spacing between the frame 710 and the electrically conductive chassis 712 is effectively utilized, as yet an additional antenna of the communication device 702 configured in yet another frequency band, for example configured to operate at sub 6 GHz frequency bands. Otherwise, the communication device 702 corresponds essentially to the communication device 102 of the previous embodiments.

Figure 9:
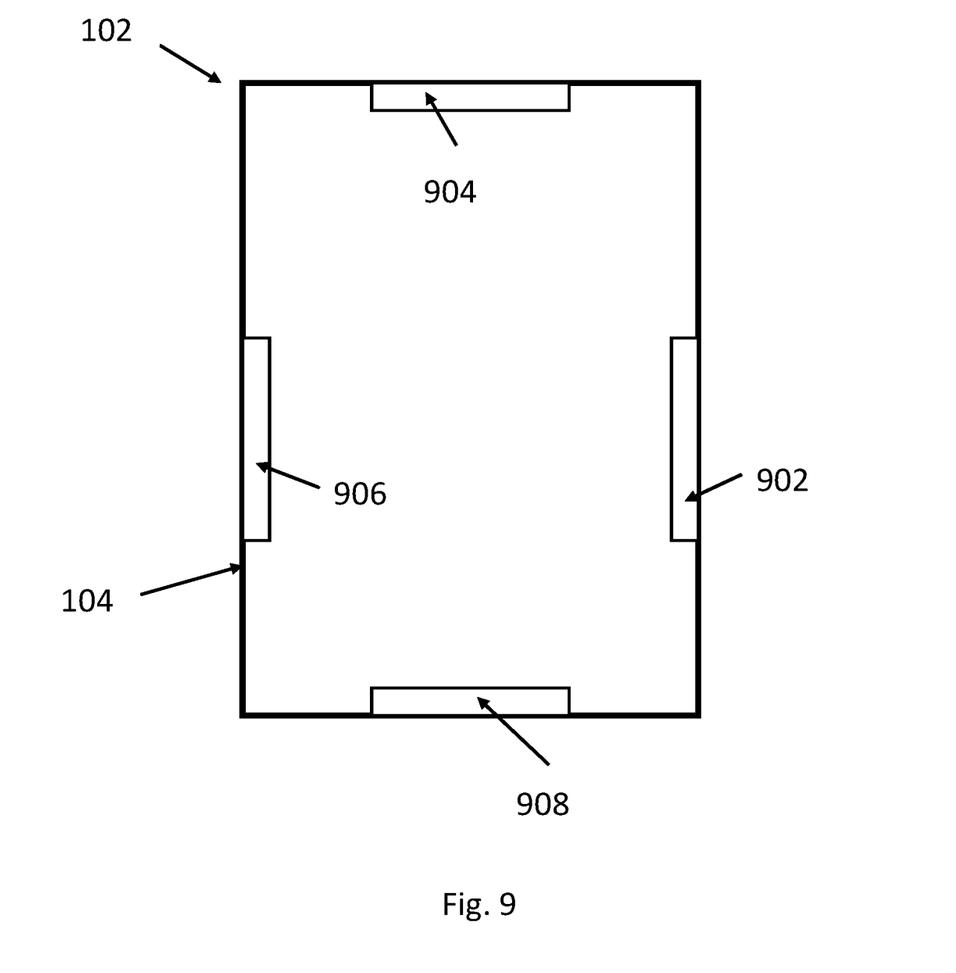
FIG. 9 is a schematic view of an embodiment of the communication device having a plurality of modules.

With reference to FIG. 9, the communication device 102 may include a plurality of modules 902, 904, 906, 908. Each module 902, 904, 906, 908 include the at least one substrate 116 defining the plurality of dielectric-filled cavities 128. In each cavity 128 or adjacent thereto a feeding element 118 and a feedline are located. Each module 902, 904, 906, 908 includes an RFIC, and the RFIC is connected to the feeding elements 118 via feedlines 302. At each module 902, 904, 906, 908 along at least a part of one side of the frame 108 and between the display 112 and the substrate 116, the chassis 114 and the frame 108 are separated from one another by a dielectric-filled intermediate space 124. At each module 902, 904, 906, 908 along the part of one side of the frame 108 and between the cover 106 and the dielectric-filled intermediate space 124, the display 112 is separated from the frame 108 by a gap 126. A plurality of waveguide structures 502 are provided. Each waveguide structure 502 is formed at least by the dielectric-filled intermediate space 124, the frame 108, the chassis 114 and the wall(s) 504. The modules 902, 904, 906, 908, in relation to one another, may be placed on generally opposite sides of the communication device 102.

It is to be understood that parts of the communication device in the figures are not shown or have been removed for illustrative purposes. The language "separated from one another" is meant that two, or more, entities or units are separated from one another by a distance; i.e. a distance is formed between two entities. However, they may still be electrically connected, directly or indirectly, to one another. The term "connected" is meant that two connected units can be electrically connected directly to one another, e.g. via an electrically conductive path, or indirectly connected/coupled to one another through some electrical manner, for example a transformer or capacitor.

The features of the different embodiments of the communication device described above may be combined in various possible ways providing further advantageous embodiments, as desired.

Finally, it is understood that the scope is not limited to the embodiments described above.

The invention claimed is:

1. A communication device comprising a housing, the housing comprising a front and a surrounding electrically conductive frame, the front comprising a dielectric cover, and the housing accommodates:
   a display covered by the cover;
   an electrically conductive chassis;
   at least one substrate comprising at least one feeding element;
   along at least a part of the frame, and between the display and the at least one substrate, the chassis and the frame are separated from one another by a dielectric-filled intermediate space;

along the part of the frame and between the cover and the dielectric-filled intermediate space, the display is separated from the frame by a gap, wherein a width of the gap provided between the display and frame is defined as a constant distance;

wherein the dielectric-filled intermediate space, together with the frame and the chassis, form at least one waveguide structure extending between the at least one substrate and the gap.

2. The communication device according to claim 1, wherein the feeding element is connected to a radio frequency integrated circuit via a feedline.

3. The communication device according to claim 1, wherein the at least one substrate is adjacent to one side of the frame.

4. The communication device according to claim 1, wherein the housing accommodates a main printed circuit board, and part of the chassis is located between the display and the main printed circuit board.

5. The communication device according to claim 4, wherein the at least one substrate is part of the main printed circuit board.

6. The communication device according to claim 4, wherein the at least one substrate is a second printed circuit board electrically connected to the main printed circuit board.

7. The communication device according to claim 4, wherein the chassis is coupled to the at least one substrate via the main printed circuit board.

8. The communication device according to claim 1, wherein the gap is filled with a dielectric material.

9. The communication device according to claim 1, wherein the at least one substrate defines at least one dielectric-filled cavity with at least partially electrically conductive sides, and the feeding element is located in the cavity or adjacent thereto.

10. The communication device according to claim 9, wherein the at least partially electrically conductive sides of the dielectric-filled cavity comprise a plurality of electrically conductive vias.

11. The communication device according to claim 9, wherein the at least one substrate defines a plurality of dielectric-filled cavities with at least partially electrically conductive sides, and, in each cavity or adjacent thereto, a feeding element is located, and each feeding element is connected to a radio frequency integrated circuit via its own feedline.

12. The communication device according to claim 11, wherein the housing accommodates at least one electrically conductive wall, two adjacent cavities are separated from one another by the wall, the wall is connected to the frame and to the chassis, and the dielectric-filled intermediate space is separated into a plurality of dielectric-filled compartments, each compartment defining a waveguide.

13. The communication device according to claim 12, further comprising a plurality of modules, each module comprising:
   the at least one substrate defining the plurality of dielectric-filled cavities;
   wherein in each cavity, or adjacent thereto, a feeding element and a feedline are located;
   a radio frequency integrated circuit, which is connected to the feeding elements via the feedlines;
   at each module along at least a part of one side of the frame, and between the display and the substrate, the chassis and the frame are separated from one another by a dielectric-filled intermediate space;
   at each module along the part of one side of the frame, and between the cover and the dielectric-filled intermediate space, the display is separated from the frame by a gap; and
   a plurality of waveguide structures, each waveguide structure being formed at least by the dielectric-filled intermediate space, the frame, the chassis and the wall or walls.

14. The communication device according to claim 13, wherein the modules, in relation to one another, are placed on generally opposite sides of the communication device.

15. The communication device according to claim 11, wherein the housing accommodates at least one electrically conductive wall, two adjacent cavities are separated from one another by the wall, the wall is connected to the frame and separated from the chassis, or the wall is connected to the chassis and separated from the frame.

* * * * *